United States Patent
Im et al.

(10) Patent No.: US 9,529,230 B2
(45) Date of Patent: Dec. 27, 2016

(54) LIQUID CRYSTAL DISPLAY APPARATUS HAVING ILLUMINATION FUNCTION

(71) Applicant: SAMSUNG ELECTRONICS CO., LTD., Suwon-si (KR)

(72) Inventors: Sang-kyun Im, Seoul (KR); Jun-mo Yoo, Yongin-si (KR); Cheon-seong Lee, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 442 days.

(21) Appl. No.: 14/104,253

(22) Filed: Dec. 12, 2013

(65) Prior Publication Data

US 2015/0042919 A1 Feb. 12, 2015

(30) Foreign Application Priority Data

Aug. 6, 2013 (KR) ........................ 10-2013-0093184

(51) Int. Cl.
  *G02F 1/1333* (2006.01)
  *G02F 1/1335* (2006.01)

(52) U.S. Cl.
  CPC ... *G02F 1/133608* (2013.01); *G02F 1/133308* (2013.01); *G02F 1/133603* (2013.01); *G02F 1/133605* (2013.01); *G02F 1/133615* (2013.01); *G02F 2001/133314* (2013.01); *G02F 2001/133626* (2013.01); *G02F 2203/62* (2013.01)

(58) Field of Classification Search
  CPC ................................. G02F 1/133608
  USPC ........................................ 349/58
  See application file for complete search history.

(56) References Cited

U.S. PATENT DOCUMENTS

| | | | |
|---|---|---|---|
| 2008/0074575 A1* | 3/2008 | Wiemer | G02F 1/133308 349/58 |
| 2010/0008067 A1 | 1/2010 | Tai et al. | |
| 2010/0271843 A1 | 10/2010 | Holten et al. | |
| 2011/0025943 A1* | 2/2011 | Cho | G02F 1/133308 349/58 |
| 2011/0096528 A1 | 4/2011 | Kim | |
| 2013/0194781 A1 | 8/2013 | Kim | |
| 2013/0201428 A1* | 8/2013 | Ohfuku | G02B 6/0055 349/65 |

FOREIGN PATENT DOCUMENTS

| | | |
|---|---|---|
| EP | 2372225 A1 | 10/2011 |
| JP | 2005-140876 A | 6/2005 |
| JP | 2011-039204 A | 2/2011 |
| KR | 10-2008-0109421 A | 12/2008 |
| WO | 2012/053397 A1 | 4/2012 |

OTHER PUBLICATIONS

Extended European Search Report dated Dec. 22, 2014 in corresponding European Patent Application No. 13198589.7.
International Search Report and Written Opinion issued May 7, 2014 in corresponding International Patent Application PTC/KR2013/011515.

* cited by examiner

*Primary Examiner* — Lucy Chien
(74) *Attorney, Agent, or Firm* — Staas & Halsey LLP

(57) ABSTRACT

A liquid crystal display apparatus includes a liquid crystal display panel to display images; a backlight unit disposed behind the liquid crystal display panel; and a chassis unit configured to accommodate the liquid crystal display panel and the backlight unit, and to emit at least some of light provided by the backlight unit behind the liquid crystal display apparatus.

16 Claims, 20 Drawing Sheets

LIQUID CRYSTAL DISPLAY APPARATUS HAVING ILLUMINATION FUNCTION

CROSS-REFERENCE TO RELATED APPLICATIONS

This application claims the benefit under 35 U.S.C. §119 (a) from Korean Patent Application No. 10-2013-0093184 filed Aug. 6, 2013 in the Korean Intellectual Property Office, the disclosure of which is incorporated herein by reference in its entirety.

BACKGROUND

1. Field

Embodiments of the present disclosure relate to a liquid crystal display apparatus. More particularly, embodiments of the present disclosure relate to a liquid crystal display apparatus having an illumination function.

2. Description of the Related Art

A liquid crystal display apparatus includes a backlight unit and a liquid crystal display panel. The liquid crystal display panel displays images by using light provided by the backlight unit.

Compared with conventional cathode-ray tube (CRT) monitors, the liquid crystal display apparatus has many advantages. That the liquid crystal display apparatus can be manufactured in the form of a thin-and-light plate may be a typical benefit. Accordingly, the liquid crystal display apparatus may be installed and used on a wall unlike the CRT monitor.

On the other hand, a light emitting diode (LED) light source is generally used as a light source of the backlight unit. Because the LED light source has advantages of low power consumption and excellent energy efficiency, it is more commonly being used as an illumination light source.

Accordingly, the inventors of the present disclosure have determined that a method in which light is provided by a backlight unit having an LED light source as an illumination light source may be of interest.

SUMMARY

The present disclosure has been developed in order to overcome the above drawbacks and other problems associated with the conventional arrangement. An aspect of the present disclosure relates to a liquid crystal display apparatus that can use light provided by a backlight unit for indoor illumination as well as for image display.

The above aspect and/or other feature of the present disclosure can substantially be achieved by providing a liquid crystal display apparatus, which may include a liquid crystal display panel to display images; a backlight unit disposed behind the liquid crystal display panel; and a chassis unit configured to accommodate the liquid crystal display panel and the backlight unit, and to emit at least some of light provided by the backlight unit behind the liquid crystal display apparatus.

The chassis unit may include a front chassis member disposed in front of the liquid crystal display panel; and a rear chassis member disposed behind the backlight unit.

The backlight unit may include at least one LED light source module; and a reflective member disposed on an internal surface of the rear chassis member to reflect light being incident from the at least one LED light source module toward the rear chassis member to the liquid crystal display panel.

The rear chassis member may include a fixed portion disposed fixedly; and a moving portion connected to the fixed portion to be opened or closed.

The moving portion may be connected rotatably to the fixed portion.

When the moving portion is opened or closed, a portion of the reflective member formed on the moving portion may be opened or closed along with the moving portion.

The reflective member may be formed in a belt shape to surround a pair of roller members, and include a first range with properties to reflect light and a second region with properties to transmit the light, and the rear chassis member may include properties to transmit the light.

The reflective member may be placed in a first position in which a space between the pair of roller members is completely covered by the first region or a second position in which the space is partially covered by the first region.

The first region and the second region may be identical in length.

The reflective member may be moved from the first position to the second position by forward rotation, and the reflective member may be moved from the second position to the first position by reverse rotation.

The backlight unit may include at least one LED light source module to move between a first position in which the backlight unit provides light for image display to the liquid crystal display panel and a second position in which the backlight unit emits illumination light outside.

The LED light source module may be disposed to face the rear chassis member in the second position.

The rear chassis member may include at least one light transmission window to transmit light generated in the LED light source module placed in the second position, and the reflective member may include at least one light passing hole formed in at least one position corresponding to the at least one light transmission window.

The light transmission window may be formed of a transparent or translucent material.

The backlight unit may include at least one LED light source module that is disposed in an edge type.

The backlight unit may include at least one LED light source module that is disposed in a direct type.

The above aspect and/or other feature of the present disclosure can substantially be achieved by providing a liquid crystal display apparatus, which may include a liquid crystal display panel to display an image, a light emitting unit to emit light, and a chassis unit comprising a rear chassis member adapted to allow light from the light emitting unit to pass through at least a portion of the rear chassis member.

The above aspect and/or other feature of the present disclosure can substantially be achieved by providing a liquid crystal display apparatus, which may include a chassis unit comprising a front chassis member and a rear chassis member, a liquid crystal display panel disposed behind the front chassis member to display an image, and a light emitting unit to emit light and disposed between the front chassis member and the rear chassis member, wherein the rear chassis member is capable of allowing light from the light emitting unit to pass through the rear chassis member.

The rear chassis member may be configured to allow the light from the light emitting unit to pass through the rear chassis member in a direction radiating outward from at least a portion of a back planar face of the rear chassis member.

Other objects, advantages and salient features of the present disclosure will become apparent from the following detailed description, which, taken in conjunction with the annexed drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
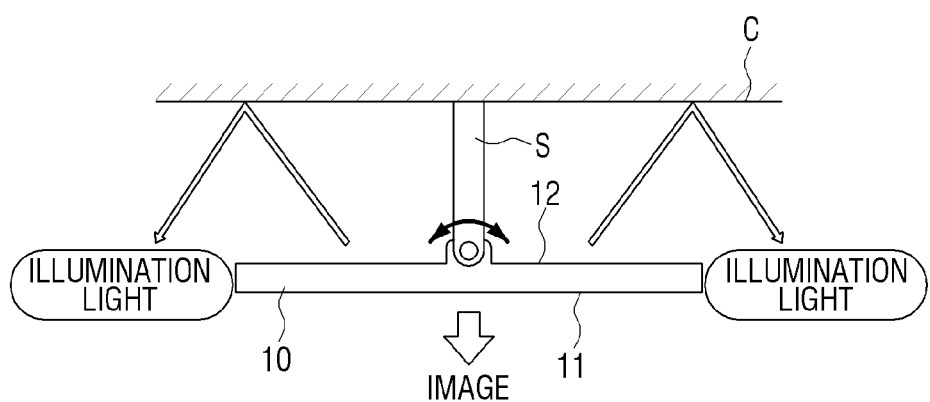
FIG. 1 is a view schematically illustrating a liquid crystal display apparatus according to an embodiment of the present disclosure hanging from a ceiling.

FIG. 1 is a view schematically illustrating a liquid crystal display apparatus hanging from a ceiling according to an embodiment of the present disclosure.

Referring to FIG. 1, a liquid crystal display apparatus 10 according to an embodiment of the present disclosure is used by being hung from a ceiling C of a room by a support unit S. Accordingly, the liquid crystal display apparatus 10 is disposed so that a front surface 11 on which images are displayed faces the room's floor and a rear surface 12 faces the ceiling C.

For example, the liquid crystal display apparatus 10 may be used as a display apparatus for a viewer lying in bed. The liquid crystal display apparatus 10 may be designed so that a direction which the front surface 11 faces is adjusted by rotation of the liquid crystal display apparatus 10 about the support unit S according to the viewer's manipulation of a remote controller. Of course, the liquid crystal display apparatus 10 may be fixed so that the front surface 11 faces a determined direction.

As illustrated in FIG. 1, at least some of light generated inside the liquid crystal display apparatus 10 may be emitted to the outside through the rear surface 12, and the emitted light may be spread widely in an indoor space, thereby functioning as illuminating light.

Hereinafter, various embodiments of liquid crystal display apparatus that may be used as the liquid crystal display apparatus 10 of FIG. 1 will be described.

Figure 2:
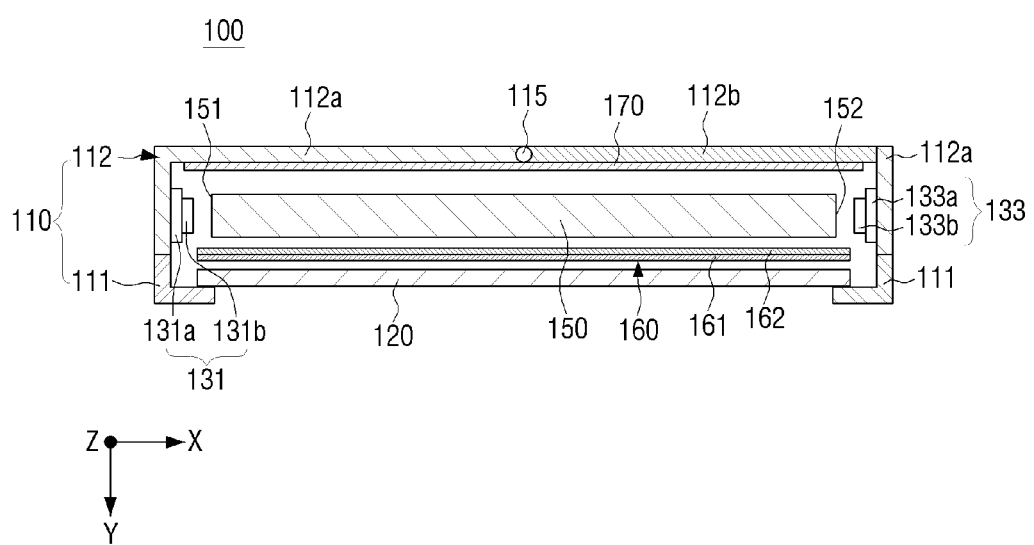
FIG. 2 is a sectional view illustrating a liquid crystal display apparatus according to a first embodiment that can be used as the liquid crystal display apparatus of FIG. 1.
Figure 3:
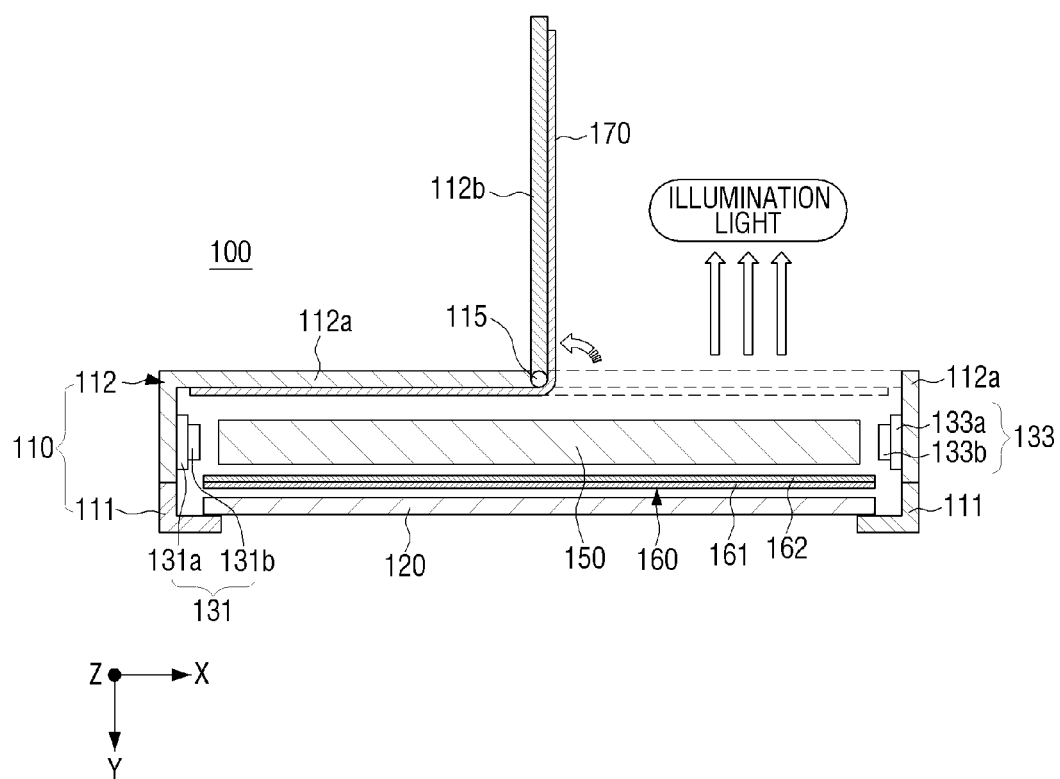
FIG. 3 is a sectional view illustrating a liquid crystal display apparatus according to a first embodiment of which a rear chassis member is open.

FIG. 2 is a sectional view illustrating a liquid crystal display apparatus according to a first embodiment that can be used as the liquid crystal display apparatus of FIG. 1, and FIG. 3 is a sectional view illustrating a liquid crystal display apparatus according to a first embodiment in which a rear chassis member is open.

Referring to FIGS. 2 and 3, a liquid crystal display apparatus 100 according to a first embodiment of the present disclosure may include, for example, a chassis unit 110, a liquid crystal display panel 120, and a backlight unit (no reference number).

The chassis unit 110 accommodates the liquid crystal display panel 120 and the backlight unit within the chassis unit 110, and supports the liquid crystal display panel 120 and the backlight unit. For example, the chassis unit 110 may be made of a metal material such as aluminum.

The chassis unit 110 includes a front chassis member 111 and a rear chassis member 112. The front chassis member 111 is disposed in front of the liquid crystal display panel 120 and has a rectangular opening for image display. The rear chassis member 112 is disposed in the rear of the liquid crystal display panel 120 and connected to the front chassis member 111. The rear chassis member 112 includes a fixed portion 112a that is fixedly disposed and a moving portion 1112b that is connected to the fixed portion 112a and that may be opened or closed. A more detailed description of the moving portion 112b will be described later.

The liquid crystal display panel 120 displays images in a front direction (e.g., in a +Y direction as illustrated in FIG. 2) through the opening in the front chassis member 111. Structure and operating principle of the liquid crystal display panel 120 are already well known and therefore detailed descriptions thereof will be omitted.

The backlight unit (no reference number) provides light for image display to the liquid crystal display panel 120. The backlight unit includes at least one LED light source module 131 and 133, a light guide plate 150, an optical sheet unit 160, and a reflective member 170. In the present embodiment, the backlight unit is equipped with two LED light source modules 131 and 133. Alternatively, the backlight unit may be equipped with only one LED light source module.

A first LED light source module 131 is disposed on the rear chassis member 112, and includes an elongated support substrate 131a and a plurality of LED light sources 131b disposed on the support substrate 131a. Similarly, a second LED light source module 133 is disposed on the rear chassis member 112a, and includes an elongated support substrate 133a and a plurality of LED light sources 133b disposed on the support substrate 133a.

Because the support substrate 131a of the first LED light source module 131 is arranged parallel to a first side surface 151 of the light guide plate 150, the light generated from the LED light sources 131b of the first LED light source module 131 enters the light guide plate 150 through the first side surface 151. Because the support substrate 133a of the second LED light source module 133 is arranged parallel to a second side surface 152 of the light guide plate 150, the light generated from the LED light sources 133b of the second LED light source module 133 enters the light guide plate 150 through the second side surface 152. As described above, the light generated in the LED light source modules 131 and 133 is incident into the light guide plate 150 through the side surfaces 151 and 152 of the light guide plate 150 so that the liquid crystal display apparatus 100 according to the present embodiment is classified as a so-called edge-type liquid crystal display apparatus.

The light guide plate 150 guides the light that is incident from the LED light source modules 131 and 133 to the liquid crystal display panel 120. The reflective member 170 is disposed behind the light guide plate 150 and reflects light being leaked behind the light guide plate 150 toward the liquid crystal display panel 120. The reflective member 170 may be provided in the form of film that can be attached to or formed on an internal surface of the rear chassis member 112 by a spray process or a plating process. The optical sheet unit 160 is disposed between the light guide plate 150 and the liquid crystal display panel 120, and improves uniformity of the plane light which is provided from the light guide plate 150 to the liquid crystal display panel 120. The optical sheet unit 160 may include a plurality of optical sheets 161 and 162. For example, a first optical sheet 161 may be a diffusion sheet and a second optical sheet 162 may be a prism sheet. However, the kind and number of optical sheets to configure the optical sheet unit 160 may be selected in various ways, depending on embodiments.

As described above, the rear chassis member 112 includes the fixed portion 112a and the moving portion 112b. The moving portion 112b is connected to the fixed portion 112a by the hinge 115. Accordingly, the moving portion 112b can be rotated between a closed position as illustrated in FIG. 2 and an open position as illustrated in FIG. 3. When the moving portion 112b is opened or closed, a portion of the reflective member 170 formed on the moving portion 112b is also opened or closed along with the moving portion 112b.

When the moving portion 112b is placed in the closed position as illustrated in FIG. 2, the light generated in the LED light source modules 131 and 133 is used only for image display. However, when the moving portion 112b is placed in the open position as illustrated in FIG. 3, some of the light generated in the LED light source modules 131 and 133 is provided to the liquid crystal display panel 120, thereby being used for image display, and the rest of the generated light is emitted outside through the opened rear chassis member 112, thereby being used for indoor illumination. Accordingly, when the moving portion 112b is placed in the open position, the liquid crystal display apparatus 100 may provide an illumination function as well as an image display function.

Depending on the choice of a user, the rear chassis member 112 may be set in one of the closed position and the open position. For example, via manipulation of a remote controller, the user may easily perform the position change of the rear chassis member 112. As another example, the user may manipulate the remote control to incrementally or gradually vary the amount of rotation of the rear chassis member 112 and thereby incrementally or gradually vary the amount of illumination.

Figure 4:
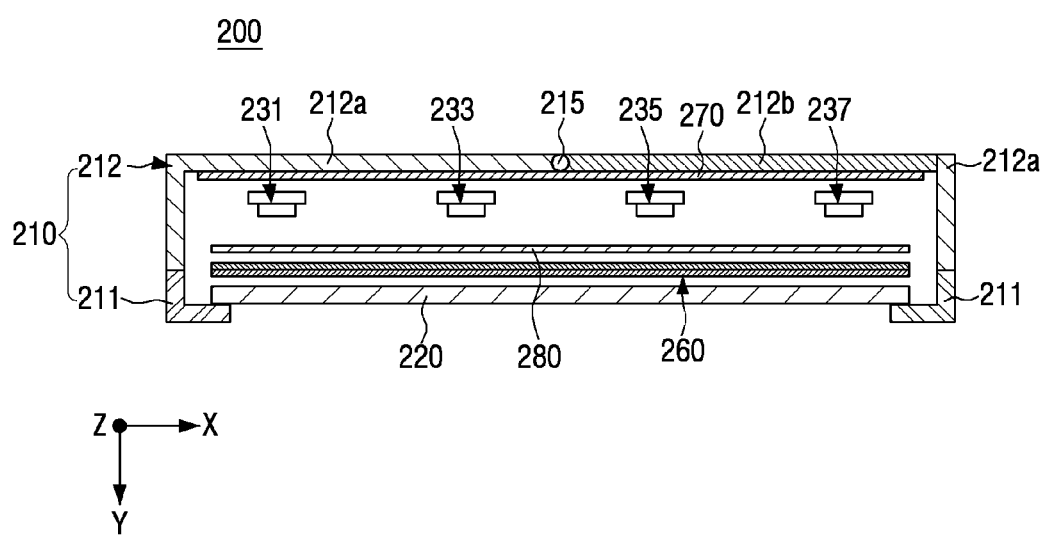
FIG. 4 is a sectional view illustrating a liquid crystal display apparatus according to a second embodiment that can be used as the liquid crystal display apparatus of FIG. 1.
Figure 5:
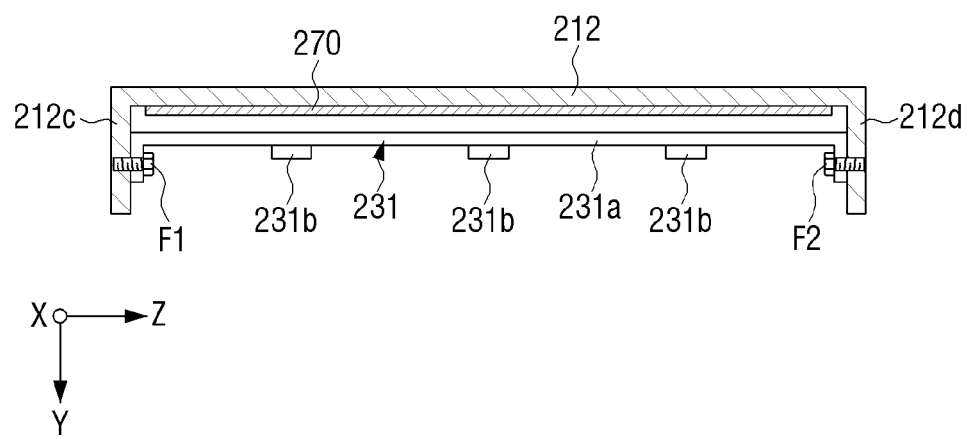
FIG. 5 is a partially sectional view illustrating a liquid crystal display apparatus according to a second embodiment along another direction.
Figure 6:
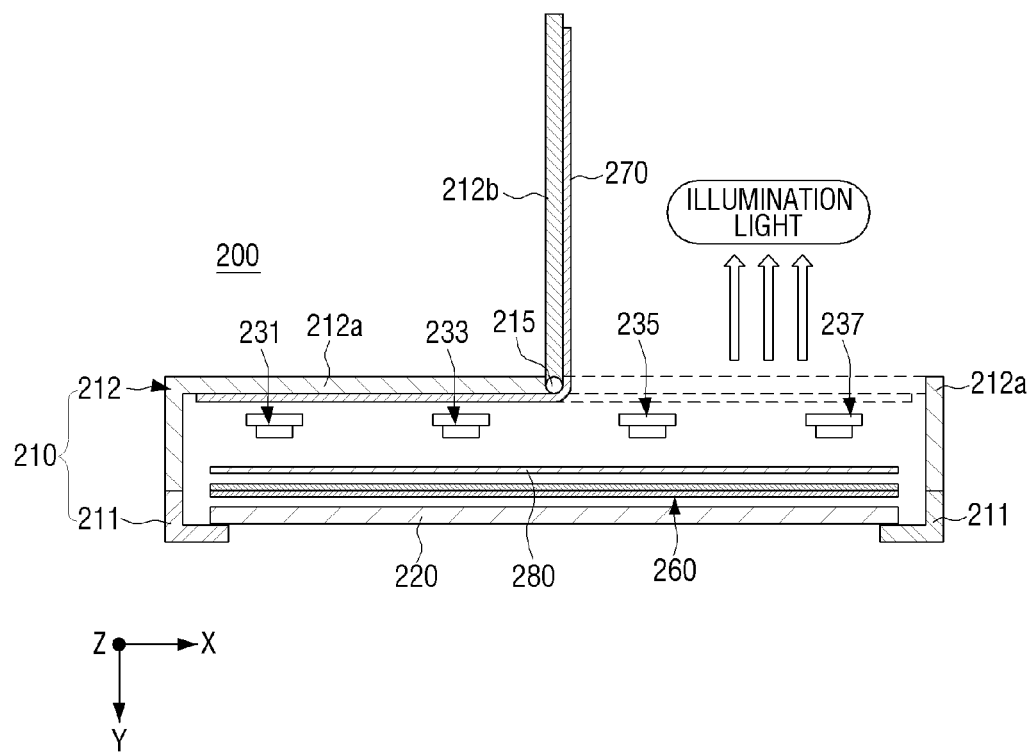
FIG. 6 is a sectional view illustrating a liquid crystal display apparatus according to a second embodiment of which a rear chassis member is open.

FIG. 4 is a sectional view illustrating a liquid crystal display apparatus according to a second embodiment that can be used as the liquid crystal display apparatus of FIG. 1, FIG. 5 is a partially sectional view illustrating a liquid crystal display apparatus according to a second embodiment along another direction, and FIG. 6 is a sectional view illustrating a liquid crystal display apparatus according to a second embodiment in which a rear chassis member is open.

Referring to FIGS. 4, 5 and 6, a liquid crystal display apparatus 200 according to a second embodiment of the present disclosure includes a chassis unit 210, a liquid crystal display panel 220, and a backlight unit (no reference number).

The chassis unit 210 and liquid crystal display panel 220 of the liquid crystal display apparatus 200 are the same as the chassis unit 110 and liquid crystal display panel 120 of the liquid crystal display apparatus 100 according to the first embodiment as described above. The chassis unit 210 includes a front chassis member 211 and a rear chassis member 212. The rear chassis member 212 includes a fixed portion 212a and a moving portion 212b that are connected to each other through a hinge 215.

The backlight unit of the liquid crystal display apparatus 200 includes a plurality of LED light source modules 231, 233, 235 and 237, an optical sheet unit 260, a reflective member 270, and a diffuser plate 280. Here, the optical sheet unit 260 and the reflective member 270 are the same as the optical sheet unit 160 and the reflective member 170 of the liquid crystal display apparatus 100 as described above. However, the backlight unit of the liquid crystal display apparatus 200 is distinct from the backlight unit of the above-described liquid crystal display apparatus 100 in that it further includes the diffuser plate 280, that it does not include a light guide plate, and that the LED light source modules 231, 233, 235 and 237 are disposed in the rear of the liquid crystal display panel 220. Here, since the LED light source modules 231, 233, 235 and 237 are disposed in the rear of the liquid crystal display panel 220, it may be seen that the liquid crystal display apparatus 200 may be classified as a direct type liquid crystal display apparatus.

Referring to FIG. 5, a first LED light source module 231 includes a support substrate 231a and a plurality of LED light sources 231b. The support substrate 231a is extended along a height direction (Z direction) of the liquid crystal display apparatus 200. Opposite ends of the support substrate 231a are fixed to two side surfaces 212c and 212d of the rear chassis member 212 by fastening members F1 and F2. As illustrated in FIG. 5, screws may be used as the fastening members F1 and F2. In the same way as the first LED light source module 231, a second LED light source module 233, a third LED light source module 235, and a fourth LED light source module 237 may be fixed to the two side surfaces 212c and 212d of the rear chassis member 212.

The moving portion 212b of the rear chassis member 212 may be placed in a closed position as illustrated in FIG. 4 or an open position as illustrated in FIG. 6. As illustrated in FIG. 6, when the moving portion 212b is placed in the open position, the liquid crystal display apparatus 200 may provide the illumination function as well as the image display function.

Figure 7:
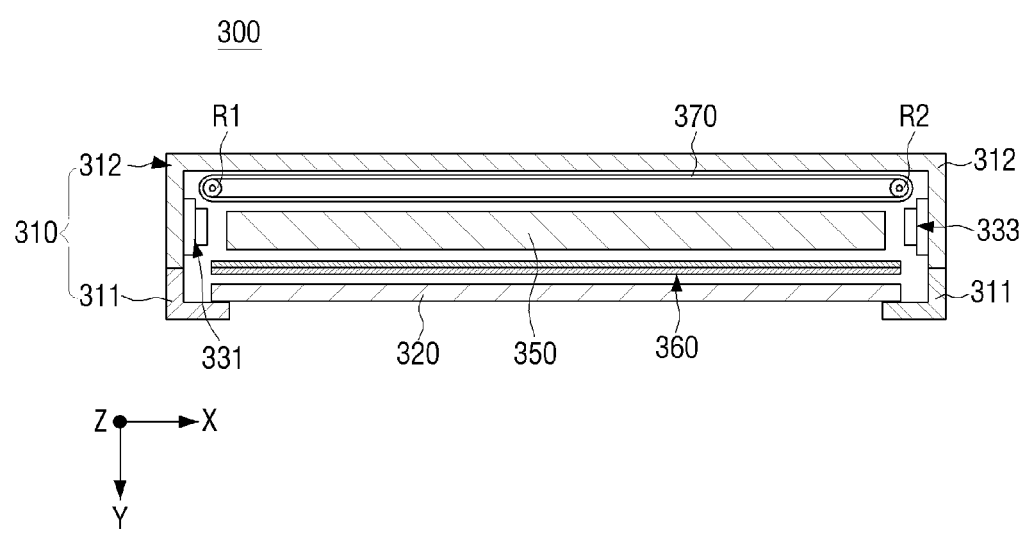
FIG. 7 is a sectional view illustrating a liquid crystal display apparatus according to a third embodiment that can be used as the liquid crystal display apparatus of FIG. 1.
Figure 8:
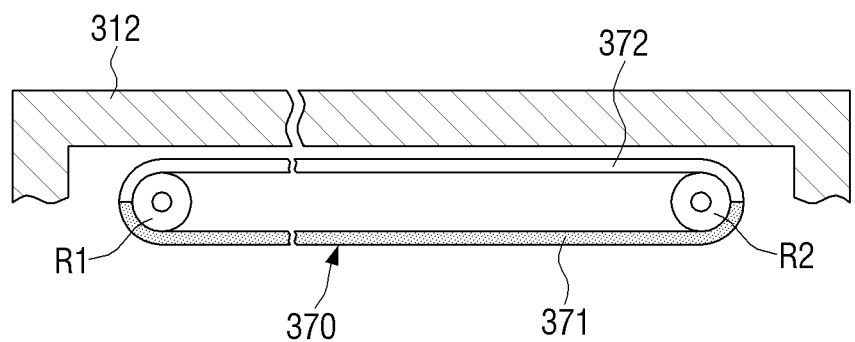
FIG. 8 is a sectional view illustrating a liquid crystal display apparatus according to a third embodiment when a reflective member is placed in a first position.
Figure 9:
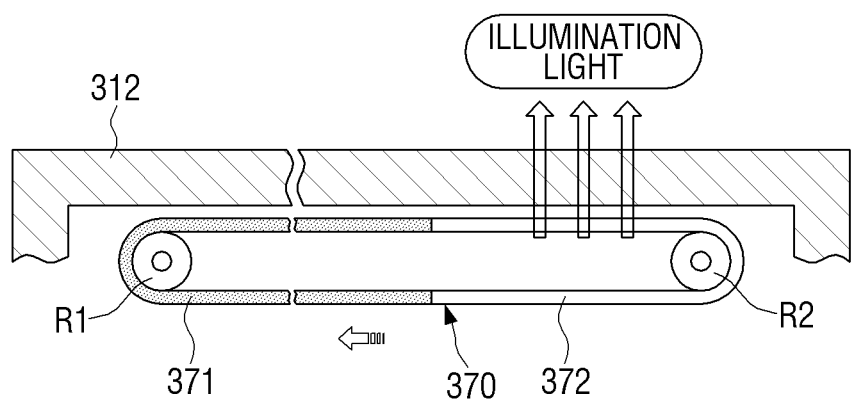
FIG. 9 is a sectional view illustrating a liquid crystal display apparatus according to a third embodiment when a reflective member is placed in a second position.

FIG. 7 is a sectional view illustrating a liquid crystal display apparatus according to a third embodiment that can be used as the liquid crystal display apparatus of FIG. 1, FIG. 8 is a sectional view illustrating a liquid crystal display apparatus according to a third embodiment when a reflective member is placed in a first position, and FIG. 9 is a sectional view illustrating a liquid crystal display apparatus according to a third embodiment when a reflective member is placed in a second position.

Referring to FIGS. 7, 8, and 9, a liquid crystal display apparatus 300 according to a third embodiment of the present disclosure may include, for example, a chassis unit 310, a liquid crystal display panel 320, and a backlight unit (no reference number).

The liquid crystal display panel 320 is the same as the liquid crystal display panel 220 of the liquid crystal display apparatus 200 according to the second embodiment as described above.

The chassis unit 310 includes a front chassis member 311 and a rear chassis member 312. The rear chassis member 312 is different from the rear chassis member 212 of the above-described liquid crystal display apparatus 200 in that the rear chassis member 312 is not divided into a fixed portion and a moving portion, and thus always remains in a closed state. The rear chassis member 312 is formed of a material with properties that can transmit light. For example, the rear chassis member 312 may be made of a transparent or translucent material.

The backlight unit of the liquid crystal display apparatus 300 includes a pair of LED light source modules 331 and 333, a light guide plate 350, an optical sheet unit 360, and a reflective member 370.

The LED light source modules 331 and 333, the light guide plate 350, and the optical sheet unit 360 are the same as the LED light source modules 131 and 133, the light guide plate 150, and the optical sheet unit 160 of the above-described liquid crystal display apparatus 100.

The reflective member 370 has a belt shape, and is disposed so as to surround a pair of roller members R1 and R2. The pair of roller members R1 and R2 is spaced apart from each other approximately as long as the width of the light guide plate 350. One of the roller members R1 and R2 may be used as a driving roller to provide the reflective member 370 with a rotational force. In the present embodiment, for example, a first roller member R1 is the driving roller. The reflective member 370 may be rotated in a forward direction or in a reverse direction by the rotational force received from the first roller member R1.

The reflective member 370 includes a first region 371 with properties to reflect light and a second region 372 with properties to transmit the light. In the present embodiment, the first region 371 and the second region 372 are identical in length. Alternatively, the length of the first region 371 may be a little longer than the length of the second region 372.

The reflective member 370 is placed in a first position as illustrated in FIG. 8 or a second position as illustrated in FIG. 9. The reflective member 370 is moved from the first position to the second position by forward rotation. The reflective member 370 is moved from the second position to the first position by reverse rotation.

As illustrated in FIG. 8, when the reflective member 370 is placed in the first position, a space between the first roller member R1 and the second roller member R2 is completely covered by the first region 371 with properties to reflect light so that the light provided by the backlight unit is not emitted at all through the rear chassis member 312. Accordingly, when the reflective member 370 is placed in the first position, the liquid crystal display apparatus 300 provides only the image display function without any illumination function.

As illustrated in FIG. 9, when the reflective member 370 is placed in the second position, only some of the space between the first roller member R1 and the second roller member R2 is covered by the first region 371 so that some of the light provided by the backlight unit may be emitted outside through the second area 372 of the reflective member 370 and the rear chassis member 312. Accordingly, when the reflective member 370 is placed in the second position, the liquid crystal display apparatus 300 may provide the image display function and the illumination function.

Depending on the choice of the user, the reflective member 370 may be set in one of the first position and the second position. For example, via manipulation of a remote controller, the user may easily perform the position change of the reflective member 370. As another example, the user may manipulate the remote control to incrementally or gradually vary the position change of the reflective member 370 between the first position and the second position and thereby incrementally or gradually vary the amount of illumination.

The liquid crystal display apparatus 300 according to the third embodiment of the present disclosure is equipped with the rear chassis member 312 with optical transparency and the reflective member 370 that selectively transmits light, thereby enabling the liquid crystal display apparatus 300 to provide an illumination function.

Alternatively, the rear chassis member 312 may be formed of a so-called 'electrocromic material' having properties that can reflect or transmit the light depending on an applied voltage. According to the alternative, the rear chassis member 312 takes over the role of the reflective member 370 so that the reflective member 370 is not necessary and can be removed from the liquid crystal display apparatus 300.

Figure 10:
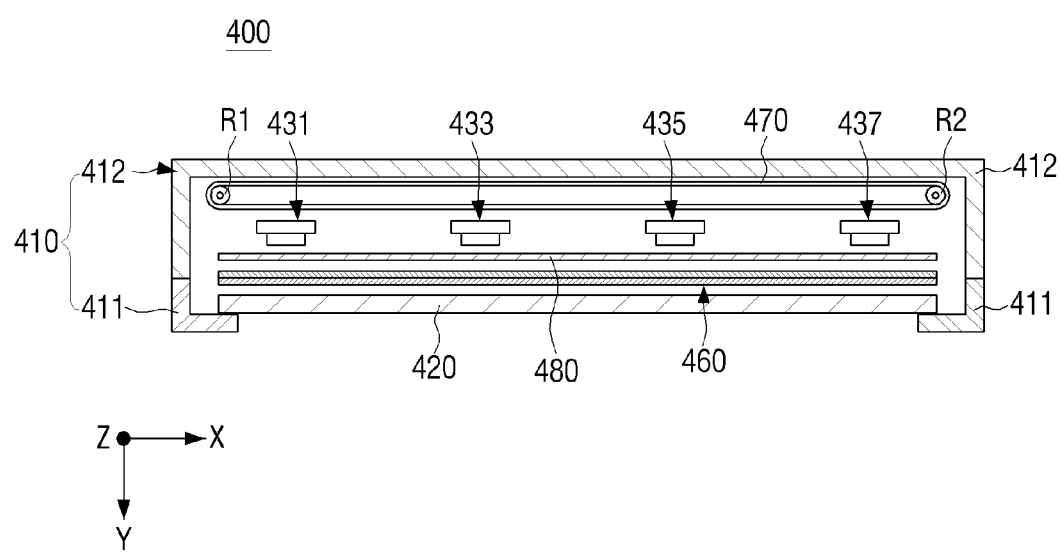
FIG. 10 is a sectional view illustrating a liquid crystal display apparatus according to a fourth embodiment that can be used as the liquid crystal display apparatus of FIG. 1.
Figure 11:
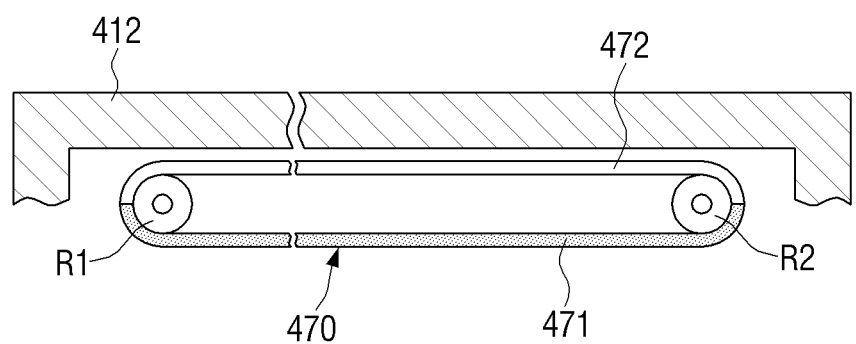
FIG. 11 is a sectional view illustrating a liquid crystal display apparatus according to a fourth embodiment when a reflective member is placed in a first position.
Figure 12:
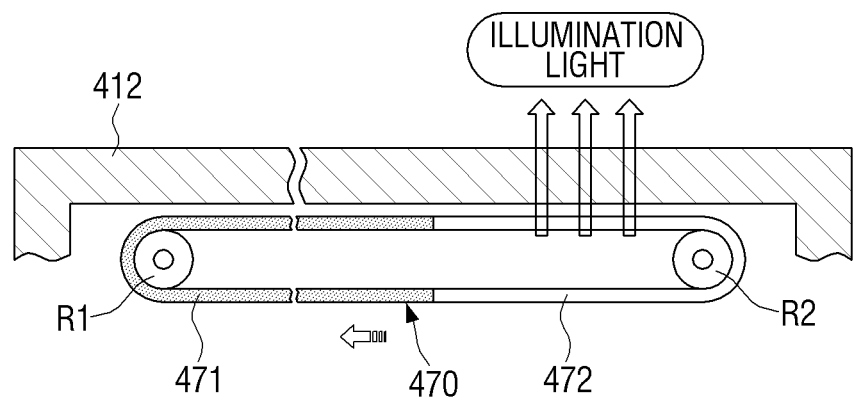
FIG. 12 is a sectional view illustrating a liquid crystal display apparatus according to a fourth embodiment when a reflective member is placed in a second position.

FIG. 10 is a sectional view illustrating a liquid crystal display apparatus according to a fourth embodiment that can be used as the liquid crystal display apparatus of FIG. 1, FIG. 11 is a sectional view illustrating a liquid crystal display apparatus according to a fourth embodiment when a reflective member is placed in a first position, and FIG. 12 is a sectional view illustrating a liquid crystal display apparatus according to a fourth embodiment when a reflective member is placed in a second position.

Referring to FIGS. 10, 11 and 12, a liquid crystal display apparatus 400 according to a fourth embodiment of the present disclosure includes a chassis unit 410, a liquid crystal display panel 420, and a backlight unit (no reference number).

The chassis unit 410 and liquid crystal display panel 420 are the same as the chassis unit 310 and liquid crystal display panel 320 of the liquid crystal display apparatus 300 according to the third embodiment as described above. The chassis unit 410 includes a front chassis member 411 and a rear chassis member 412. The rear chassis member 412 has properties that allow the rear chassis member 412 to transmit light. For example, the rear chassis member 412 may be made of a transparent or translucent material.

The backlight unit of the liquid crystal display apparatus 400 includes a plurality of LED light source modules 431, 433, 435, and 437, an optical sheet unit 460, a reflective member 470, and a diffuser plate 480. Here, the LED light source modules 431, 433, 435, and 437, the optical sheet unit 460, and the diffuser plate 480 are the same as the LED light source modules 231, 233, 235, and 237, the optical sheet unit 260 and the diffuser plate 280 of the above-described liquid crystal display apparatus 200. The reflective member 470 is the same as the reflective member 370 of the above-described liquid crystal display apparatus 300. Accordingly, the reflective member 470 includes a first region 471 with properties to reflect light and a second region 472 with properties to transmit the light.

The reflective member 470 may be placed in a first position in which a space between a first roller member R1 and a second roller member R2 is completely covered by the first region 471 as illustrated in FIG. 11 or a second position in which the space between the first roller member R1 and the second roller member R2 is partially covered by the first region 471 as illustrated in FIG. 12. When the reflective member 470 is placed in the second position, the liquid crystal display apparatus 400 may perform an illumination function by emitting some of the light generated in the backlight unit outside through the rear chassis member 412 having optical transparency.

Figure 13:
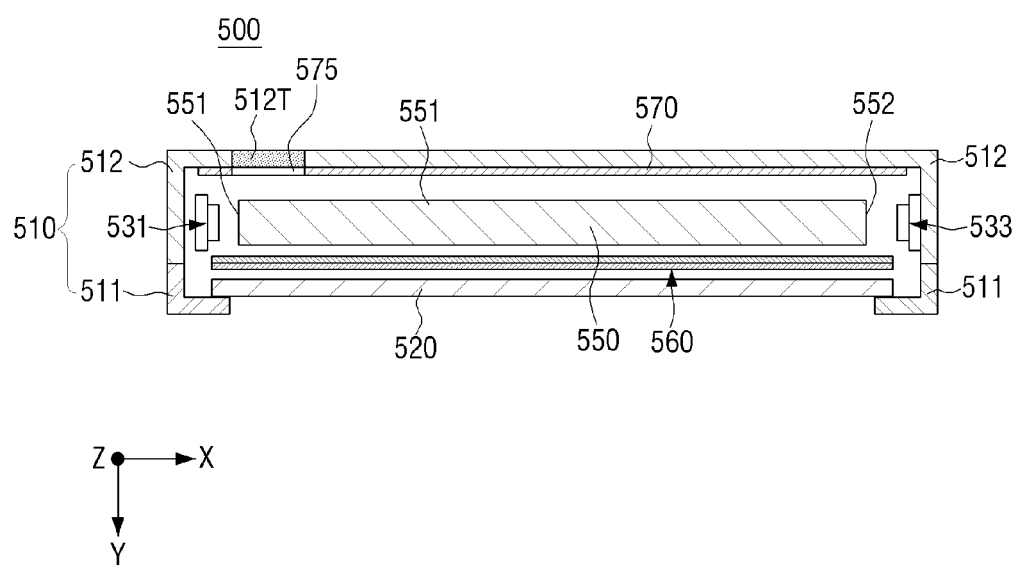
FIG. 13 is a sectional view illustrating a liquid crystal display apparatus according to a fifth embodiment that can be used as the liquid crystal display apparatus of FIG. 1.
Figure 14:
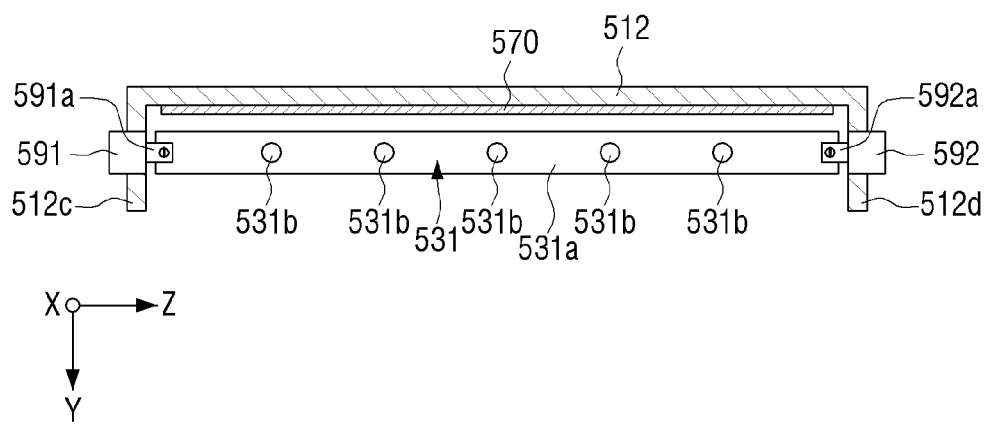
FIG. 14 is a partially sectional view illustrating a liquid crystal display apparatus according to a fifth embodiment along another direction.
Figure 15:
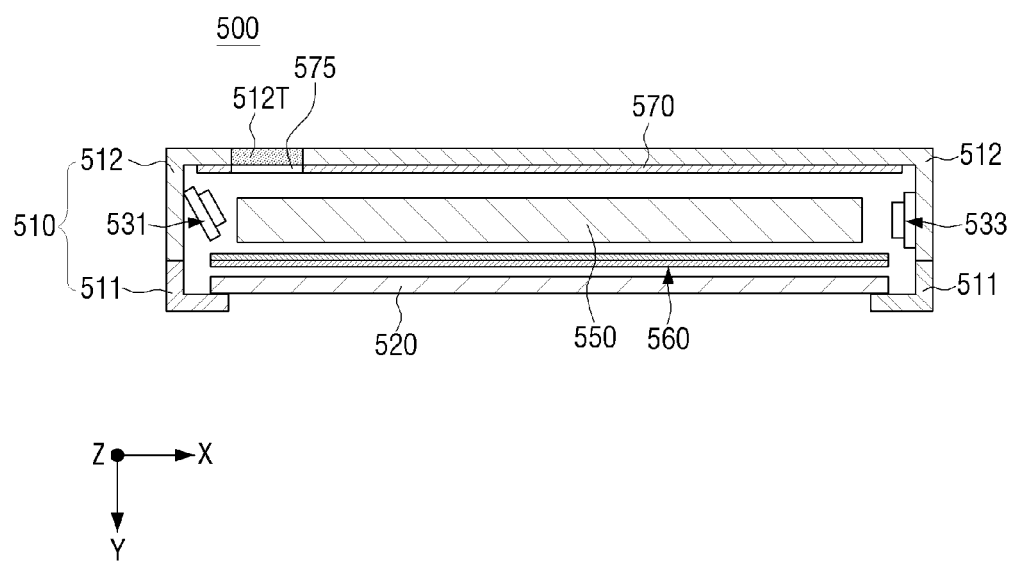
FIG. 15 is a sectional view illustrating a liquid crystal display apparatus according to a fifth embodiment when a first LED light source module is rotated toward a rear chassis member.
Figure 16:
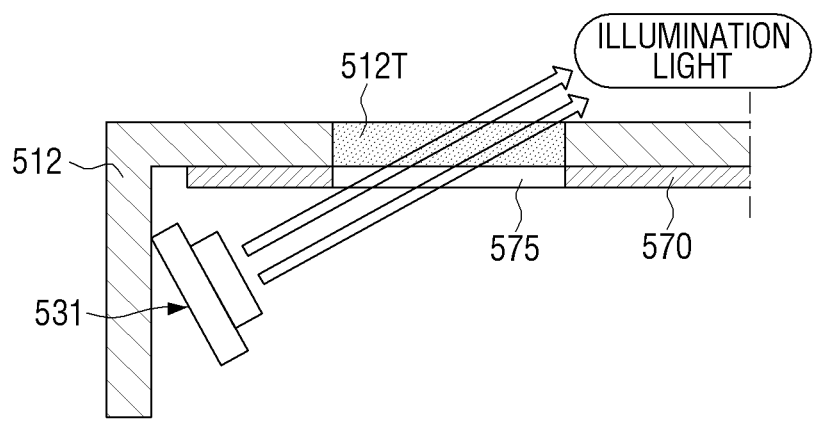
FIG. 16 is a partially sectional view illustrating a portion of FIG. 15.

FIG. 13 is a sectional view illustrating a liquid crystal display apparatus according to a fifth embodiment that can be used as the liquid crystal display apparatus of FIG. 1, FIG. 14 is a partially sectional view illustrating a liquid crystal display apparatus according to a fifth embodiment along another direction, FIG. 15 is a sectional view illustrating a liquid crystal display apparatus according to a fifth embodiment when a first LED light source module is rotated toward a rear chassis member, and FIG. 16 is a partially sectional view illustrating a portion of FIG. 15.

Referring to FIGS. 13, 14, 15 and 16, a liquid crystal display apparatus 500 according to a fifth embodiment of the present disclosure may include, for example, a chassis unit 510, a liquid crystal display panel 520, and a backlight unit (no reference number).

The chassis unit 510 may include a front chassis member 511 and a rear chassis member 512. A light transmission window 512T is extended in the height direction (Z direction) of the liquid crystal display apparatus 500, and formed in the rear chassis member 512. The light transmission window 512T of the rear chassis member 512 is formed of a transparent or translucent material. The remaining portion of the rear chassis member 212 is formed of a material such as aluminum that does not transmit light.

The backlight unit of the liquid crystal display apparatus 500 includes at least one LED light source module 531 and 533, a light guide plate 550, an optical sheet unit 560, and a reflective member 570.

In the present embodiment, the backlight unit includes a first LED light source module 531 and a second LED light source module 533. As illustrated in FIG. 14, the first LED light source module 531 includes a support substrate 531a and a plurality of LED light sources 531b. A first motor 591 and a second motor 592 are disposed at a first side surface 512c and a second side surface 512d of the rear chassis member 512, respectively. Opposite ends of the support substrate 531a are coupled to a rotor 591a of the first motor 591 and a rotor 592a of the second motor 592 so that the first LED light source module 531 can be rotated on a rotation shaft parallel to the Z axis by the first motor 591 and the second motor 592. For example, the first motor 591 and the second motor 592 may be equipped as a step motor. As illustrated in FIG. 13, the second LED light source module 533 is disposed directly on the rear chassis member 512 unlike the first LED light source module 531.

A light passing hole 575 is extended in the height direction (Z direction) of the liquid crystal display apparatus 500 and is formed in the reflective member 570. The shape and position of the light passing hole 575 correspond to the shape and position of the light transmission window 512T formed in the rear chassis member 512.

When the liquid crystal display apparatus 500 is to be used only for image display and not for illumination, the first and second LED light source modules 531 and 533 are placed to face the side surfaces 551 and 552 of the light guide plate 550. However, when the liquid crystal display apparatus 200 is used for image display and for illumination, as illustrated in FIGS. 15 and 16, the second LED light source module 533 is still positioned to face the side surface 552 of the light guide plate 550 while the first LED light source module 531 is rotated by motors 591 and 592 thereby being placed to face the light transmission window 512T of the rear chassis member 512. Here, the first LED light source module 531 may be variably placed in a first position in which it faces the side surface 551 of the light guide plate 150 or a second position in which it faces the light transmission window 512T of the rear chassis member 512 or in any number of intermediate positions. As an example, the user may manipulate the remote control to incrementally or gradually vary the position of the first LED light source module 531 between the first position and the second position and thereby incrementally or gradually vary the amount of illumination.

When the first LED light source module 531 is placed in the second position, at least some of the light generated in the first LED light source module 531 is emitted outside through the light transmission window 512T of the rear chassis member 512 so that the illumination function of the liquid crystal display apparatus 500 is achieved.

Depending on the choice of the user, the first LED light source module 531 may be set in one of the first position and the second position, or in any of a plurality of intermediate positions. For example, via manipulation of a remote controller, the user may easily change the position of the first LED light source module 531.

On the other hand, in the present embodiment, only the first LED light source module 531 is disposed rotatably in the rear chassis member 512 for the illumination function. Alternatively, both the first LED light source module 531 and the second LED light source module 533 may be disposed rotatably in the rear chassis member 512 for performing the illumination function. In the case of the alternative embodiment, an additional light transmission window and an additional light passing hole would be required in the rear chassis member 512 and the reflective member 570, respectively.

Also, in the present embodiment, the light transmission window 512T is formed of a transparent or translucent material. Alternatively, the light transmission window 512T may be formed as an opening in which no material is filled.

Figure 17:
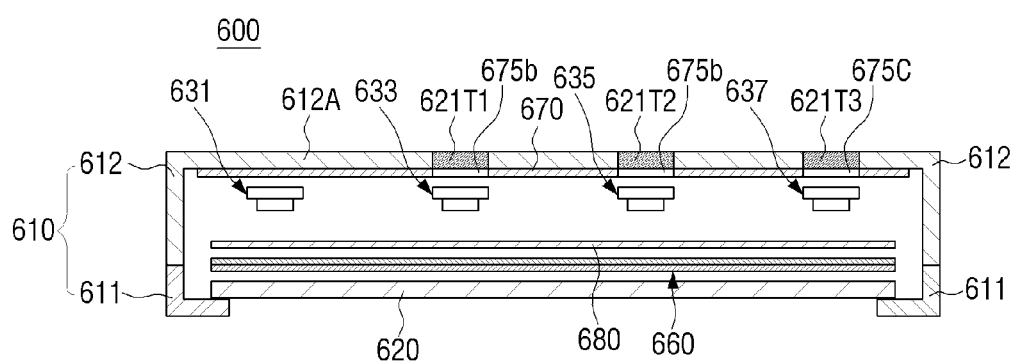
FIG. 17 is a sectional view illustrating a liquid crystal display apparatus according to a sixth embodiment that can be used as the liquid crystal display apparatus of FIG. 1.
Figure 18:
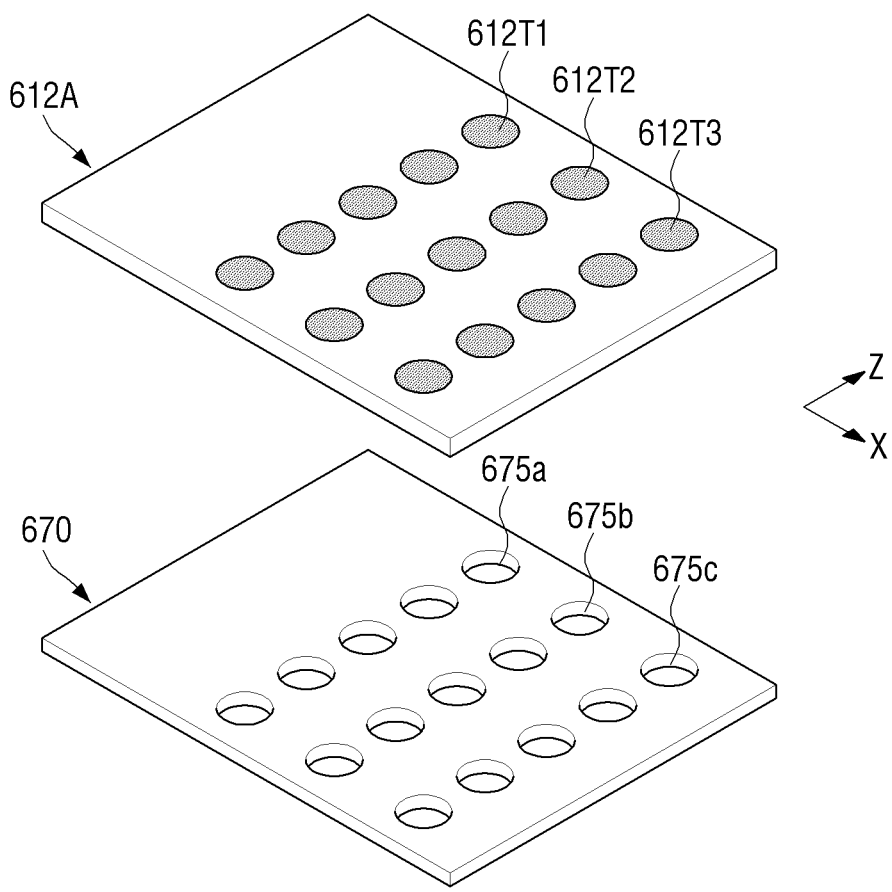
FIG. 18 is a perspective view illustrating a bottom portion of a rear chassis member and a reflective member equipped with a liquid crystal display apparatus according to a sixth embodiment.
Figure 19:
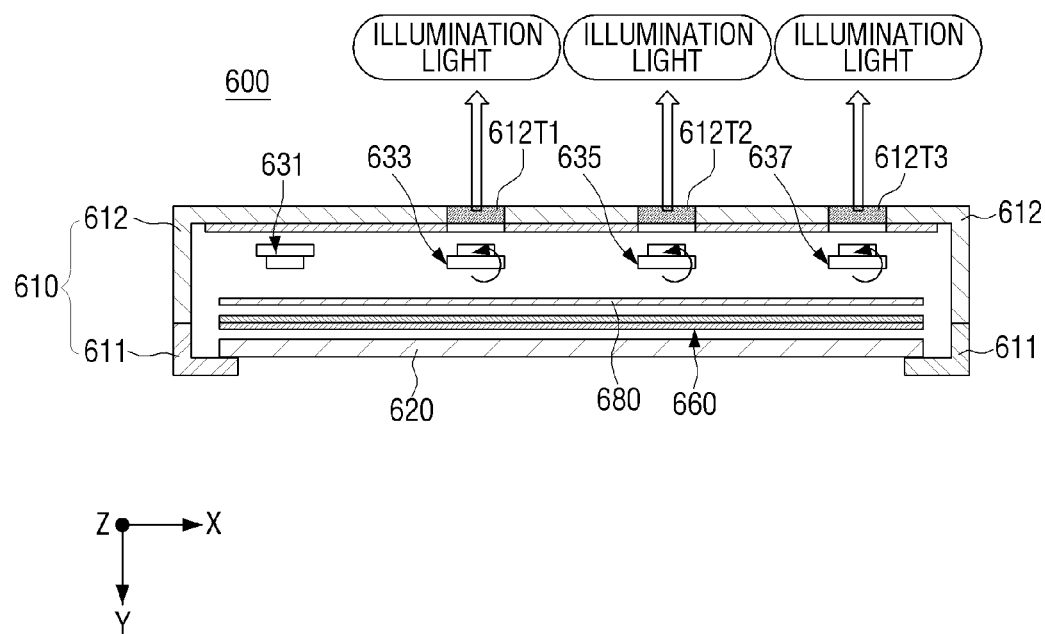
FIG. 19 is a sectional view illustrating a state in which a liquid crystal display apparatus according to a sixth embodiment provides an illumination function.

FIG. 17 is a sectional view illustrating a liquid crystal display apparatus according to a sixth embodiment that can be used as the liquid crystal display apparatus of FIG. 1, FIG. 18 is a perspective view illustrating a bottom portion and a reflective member of a rear chassis member equipped with a liquid crystal display apparatus according to a sixth embodiment, and FIG. 19 is a sectional view illustrating a state in which a liquid crystal display apparatus according to a sixth embodiment provides an illumination function.

Referring to FIGS. 17, 18, and 19, a liquid crystal display apparatus 600 according to a sixth embodiment of the present disclosure may include, for example, a chassis unit 610, a liquid crystal display panel 620, and a backlight unit (no reference number).

The chassis unit 610 includes a front chassis member 611 and a rear chassis member 612. As illustrated in FIG. 18, a plurality of first light transmission windows 612T1, a plurality of second light transmission windows 612T2, and a plurality of third light transmission windows 612T3 are formed in a bottom portion 612A of the rear chassis member 612. The first, second, and third light transmission windows 612T1, 612T2, and 612T3 may be formed of a transparent or translucent material or may be formed as openings in which no material is filled.

The backlight unit of the liquid crystal display apparatus 600 includes a plurality of LED light source modules 631, 633, 635, and 637, an optical sheet unit 660, a reflective member 670, and a diffuser plate 680. The backlight unit according to the present embodiment includes a first LED light source module 631, a second LED light source module 633, a third LED light source module 635, and a fourth LED light source module 637.

As illustrated in FIG. 18, a plurality of first light passing holes 675a, a plurality of second light passing holes 675b, and a plurality of third light passing holes 675c are formed in the reflective member 670. The shape and position of the first light passing holes 675a are formed to correspond to the shape and position of the first light transmission windows 612T1, the shape and position of the second light passing holes 675b are formed to correspond to the shape and position of the second light transmission windows 612T2 and the shape and position of the third light passing holes 675c are formed to correspond to the shape and position of the third light transmission windows 612T3.

The first LED light source module 631 is fixedly disposed on the rear chassis member 612 by fastening members, for example, as illustrated in FIG. 5. However, each of the second LED light source module 633, the third LED light source module 635, and the fourth LED light source module 637 may be placed in a first position in which it faces the liquid crystal display panel 620 or a second position in which it faces the rear chassis member 612. In order to allow position change between the first position and the second position, each of the second LED light source module 633, the third LED light source module 635, and the fourth LED light source module 637 may be rotatably disposed in the rear chassis member 612 through the two motors 591 and 592 as illustrated in FIG. 14.

When at least one of the second LED light source module 633, the third LED light source module 635, and the fourth LED light source module 637 is placed in the second position, the light generated in the LED light source module placed in the second position is emitted outside through the reflective member 670 and the rear chassis member 612 so that the illumination function of the liquid crystal display apparatus 600 is performed.

In the present embodiment, three LED light source modules 633, 635 and 637 among the four LED light source modules 631, 633, 635 and 637 are formed to enable the position change between the first position and the second position. However, in alternative embodiments, only one LED light source module may be formed to enable such position change or all LED light source modules may be formed to enable such position change.

Figure 20:
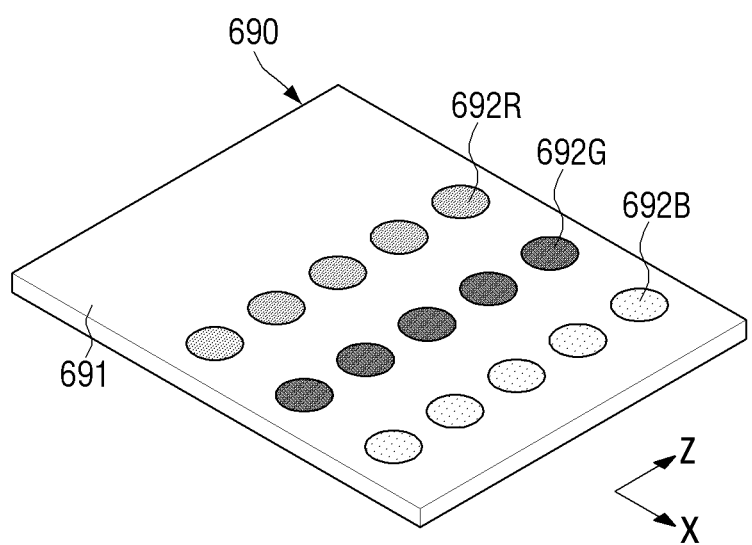
FIG. 20 is a perspective view illustrating a color filter member that is available in the rear of a rear chassis member of a liquid crystal display apparatus according to a sixth embodiment.

In the above-described liquid crystal display apparatus 600, a color filter member 690 as illustrated in FIG. 20 may be disposed in the rear of the rear chassis member 612. The color filter member 690 consists of a body portion 691 in the form of rectangular film and a plurality of color filters 692R, 692G, and 692B. First color filters 692R with red color are placed to correspond to the position of the first light transmission windows 612T1 as described above, second color filters 692G with green color are placed to correspond to the position of the second light transmission windows 612T2 as described above, and third color filters 692B with blue color are placed to correspond to the position of the third light transmission windows 612T3 as described above.

By being equipped with the color filter member 690 the liquid crystal display apparatus 600 may provide illumination light of various colors. For example, when only the second LED light source module 633 is placed in the second position, red illumination light may be provided by the liquid crystal display apparatus 600. When only the third LED light source module 635 is placed in the second position, green illumination light may be provided by the liquid crystal display apparatus 600. When only the fourth LED light source module 637 is placed in the second position, blue illumination light may be provided by the liquid crystal display apparatus 600. When the three LED light source modules 633, 635, and 637 are placed in the second position, white illumination light may be provided by the liquid crystal display apparatus 600. Accordingly, in an embodiment a user may select a desired illumination color.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:
1. A liquid crystal display apparatus comprising:
a chassis unit comprising a front and a back, the chassis unit including:
a front chassis member that includes the front of the chassis unit; and a rear chassis member that includes the back of the chassis unit, the rear chassis member including a fixed portion disposed fixedly and a moving portion connected to the fixed portion and configured to be opened or closed;
a liquid crystal display panel to display images; and
a backlight unit disposed between the liquid crystal display panel and the back of the chassis unit, the backlight unit including:
an LED light source module; and
a reflective member disposed on an internal surface of the rear chassis member to reflect light that is incident from the LED light source module toward the liquid crystal display panel;
the chassis unit being configured to accommodate the liquid crystal display panel and the backlight unit, and to emit at least some light provided by the backlight unit via the back of the chassis unit.

2. The liquid crystal display apparatus of claim 1, wherein the moving portion is connected rotatably to the fixed portion.

3. The liquid crystal display apparatus of claim 1, wherein when the moving portion is opened or closed, a portion of the reflective member formed on the moving portion is opened or closed along with the moving portion.

4. The liquid crystal display apparatus of claim 1, wherein the reflective member is formed in a belt shape to surround a pair of roller members, and comprises a first region with properties to reflect light and a second region with properties to transmit the light, and
the rear chassis member is adapted to transmit the light.

5. The liquid crystal display apparatus of claim 4, wherein the reflective member is placed in a first position in which a space between the pair of roller members is completely covered by the first region or a second position in which the space is partially covered by the first region.

6. The liquid crystal display apparatus of claim 5, wherein the first region and the second region are identical in length.

7. The liquid crystal display apparatus of claim 6, wherein the reflective member is configured to move from the first position to the second position by forward rotation, and the reflective member is configured to move from the second position to the first position by reverse rotation.

8. The liquid crystal display apparatus of claim 1, wherein the LED light source module moves between a first position in which the backlight unit provides light for image display to the liquid crystal display panel and a second position in which the backlight unit emits illumination light outside of the liquid crystal display apparatus.

9. The liquid crystal display apparatus of claim 8, wherein the LED light source module is disposed to face the rear chassis member in the second position.

10. The liquid crystal display apparatus of claim 9, wherein
the rear chassis member comprises at least one light transmission window to transmit light generated in the LED light source module placed in the second position, and
the reflective member comprises at least one light passing hole formed in at least one position corresponding to the at least one light transmission window.

11. The liquid crystal display apparatus of claim 10, wherein the light transmission window is formed of a transparent or translucent material.

12. The liquid crystal display apparatus of claim 1, wherein
the LED light source module is disposed as an edge-type or as a direct-type.

13. A liquid crystal display apparatus comprising:
a chassis unit comprising a front and a back;
a liquid crystal display panel to display an image; and
a light emitting unit to emit light that is disposed between the liquid crystal display panel and the back of the chassis unit;
the chassis unit further comprising a rear chassis member that includes the back of the chassis unit and is adapted to allow light from the light emitting unit to pass through at least a portion of the back of the chassis unit, the rear chassis member including:
a fixed portion; and
a moving portion connected by a hinge to the fixed portion and configured to be rotatably opened or closed.

14. The liquid crystal display apparatus of claim 13, further comprising:
a plurality of first light transmission windows, a plurality of second light transmission windows, and a plurality of third light transmission windows formed in a bottom portion of the rear chassis member;
a reflective member comprising a plurality of first light passing holes, a plurality of second light passing holes, and a plurality of third light passing holes formed in the reflective member and wherein a shape and position of the first light passing holes are formed to correspond to a shape and position of the first light transmission windows, a shape and position of the second light passing holes are formed to correspond to a shape and position of the second light transmission windows, and a shape and position of the third light passing holes are formed to correspond to a shape and position of the third light transmission windows; and
a first LED light source module, a second LED light source module, and a third LED light source module rotatably disposed in the rear chassis member.

15. A liquid crystal display apparatus comprising:
a chassis unit comprising a front chassis member and a rear chassis member, wherein the rear chassis member comprises:
a fixed portion; and
a moving portion connected by a hinge to the fixed portion and configured to be rotatably opened or closed;
a liquid crystal display panel disposed behind the front chassis member to display an image; and
a light emitting unit to emit light and disposed between the front chassis member and the rear chassis member, wherein the rear chassis member is capable of allowing light from the light emitting unit to pass through a back of the rear chassis member, wherein the back of the rear chassis member is disposed opposite the front chassis member.

16. The liquid crystal display apparatus of claim 15, wherein the back of the rear chassis member comprises a back planar face of the rear chassis member.

* * * * *